Nov. 13, 1956  K. A. H. LINDBLOM  2,770,067
PROCESS FOR THE PRODUCTION OF A BAIT FOR KILLING
RODENTS, MOLES AND NOXIOUS ANIMALS
Filed July 23, 1952

INVENTOR
KARL A. H. LINDBLOM
BY
ATTORNEY

United States Patent Office 2,770,067
Patented Nov. 13, 1956

2,770,067

PROCESS FOR THE PRODUCTION OF A BAIT FOR KILLING RODENTS, MOLES, AND NOXIOUS ANIMALS

Karl Axel Helmer Lindblom, Stockholm, Sweden, assignor to Rodentin Aktiebolag, Stockholm, Sweden Application July 23, 1952, Serial No. 300,478

Claims priority, application Sweden September 29, 1951

2 Claims. (Cl. 43—124)

The present invention relates to improvements in rodenticidal baits and to a process for the production of the same.

Baits for rodents such as voles, rats, mice, wild rabbits or the like and moles, certain "gnawing" insects and other pests with similar habits, should in the first place fulfill the following conditions, viz., they should be:

(1) Tempting to the pests to be destroyed;
(2) Effective;
(3) Adapted for use;
(4) Durable (adapted for storage) and, which is very important
(5) Substantially harmless to useful animals and human beings.

The first four conditions are readily satisfied in several ways. In general, the rodenticide is employed with a carrier in the form of a foodstuff, e. g., edible grain which is attractive to rodents. Different kinds of effective rodenticides and insecticides are known which at least under certain conditions are suitable for the killing of the pests in question. Several good and durable preparations are available commercially. However, these preparations have one drawback inasmuch as they are not sufficiently selective in their action and, being therefore toxic to e. g., children, domestic animals and protected game, must be used with great care. To reduce the dosage of the active rodenticide is not a satisfactory answer to the problem.

According to the present invention, a rodentical or like composition comprises whole grains (caryopsis) of Indian corn (Zea Mays) containing an active rodenticide or insecticide concentrated in the porous cellular tissue located in the embryo portion of the caryopsis.

It has been discovered that rodents and other pests with like habits, although attracted by Indian corn, do not eat the whole grain unless they are exceptionally hungry, but normally rejected the endosperns, with its hard cellular tissue rich in starch and gluten, in favor of the porous almost blotting-paper like cellular tissue which is located in the embryo portion, surrounding the plumule and constituting about 15 percent by weight of the caryopsis.

Figure 1:
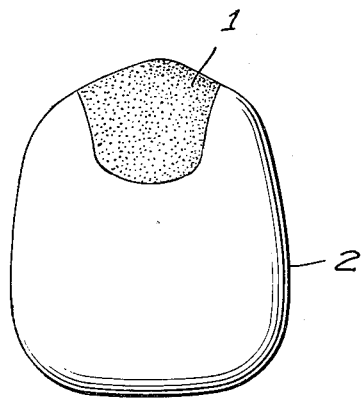
Fig. 1 shows an ordinary grain or caryopsis of Indian corn.
Figure 2:
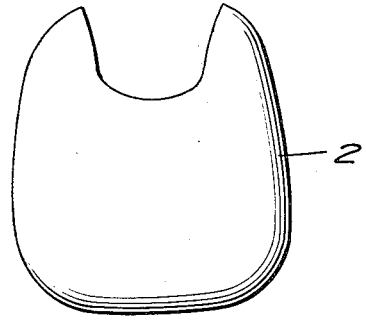
Fig. 2 shows a typical grain as it usually appears after having been gnawed by a rat.

Referring to the drawings, it will be noted that the grain of Indian corn is shown as composed of an endospern portion 2 composed of a hard cellular tissue and an embryo portion 1 composed of a porous almost blotting-paper like cellular tissue.

It will thus be appreciated that in normal practice a rodent will eat only about 11% to 12% by weight of the grain, whereas a human being or a domestic animal would, if the grain were sufficiently tempting, normally eat the whole grain. It is accordingly possible by producing a rodenticidal bait in accordance with the invention:

(a) To ensure that used bait, i. e., bait that has been nibbled or gnawed by a rodent is substantially non-toxic to humans and to domestic animals, or (b) Since the rodenticide or insecticide is concentrated in but a small part of the bait, to reduce the quantity of active substance associated with the grain.

As active agents, the so-called anti-blood-coagulant derivatives of 4-oxy-coumarines are preferred. Very small repeated doses of these compounds are lethal to rodents owing to the capillary injuries and internal bleeding they cause. On the other hand, single larger doses are relatively harmless. This is desirable due to the reduced risk of poisoning on accidental intake by human beings or domestic animals. It has hitherto not been found that the rodents either suffer pain from or become insensitive to these compounds. Examples of 4-oxy-coumarine derivatives are: 3-(α-acetonyl-benzyl)-4-oxy-coumarine, 3-α-phenyl-β-acetyl-ethyl)-4-oxy-coumarine and 3-(α-phenyl-β-benzoyl-ethyl)-4-oxy-coumarine. Also other active agents than these oxy-coumarine derivatives may of course be used under certain conditions, as for example, thallium sulphate, cadmium sulphate, sodium fluoride and sodium fluoroacetate.

The risk of mistakes being made may be reduced by impregnating the bait with a protective color. It is also possible to make the baits more tempting to rodents by adding a flavoring agent as for example sugar solution, cod liver oil, and meat extract. The flavoring agent and the protective color are, of course, concentrated in the porous part of the grain as is the active agent.

The following example illustrates a method of carrying out the present invention, but it is to be understood that this example is given primarily by way of illustration and not of limitation.

*Example*

One hundred kilograms of grains of Indian corn of storable dryness are impregnated in a rotary drum with 20 liters of an aqueous solution containing .125% by weight of 3-(α-acetonylbenzyl)-4-oxy-coumarine during about 2 hours. The porous part of the grains absorbs the liquid during this period. The grains thus treated are dried in a drying-kiln for corn to storable dryness. A bait thus produced will contain about .125% by weight of said 4-oxy-coumarine derivative. If the lethal dose is estimated to be about 20 mgs. of said 4-oxy-coumarine derivative per kg. body-weight (there is considerable variation due to the condition of the animal in question and to the proportion of K-vitamin in their food), a rat weighing 250 gms. should have to eat about 20 gms. of the bait during a few days and a dog weighing 5 kgms. about 400 gms. of the bait to get a lethal dose of the agent provided that the animals eat the whole grain. As this is not the case with those pests that are to be killed with a bait according to the present invention which only eat the porous part of the grain, i. e. about 11–12% thereof, they have to eat no more than about 12% of the abovementioned weight of the bait, i. e. about 2.5 gms., in order to get a lethal dose of the toxic agent.

From this it will be seen that a bait according to the present invention is about 8 times as dangerous for the noxious animals as for those beings that are to be protected, counted on the body-weight. This fact—and the fact that a rat eats about one tenth of its bodyweight a day (about 25 gms.)—makes it possible to substantially reduce the proportion of the killing agent in the bait, if this should be desired for safety reasons, without the bait losing in value as an agent for the killing of noxious animals, especially rats.

Modifications may be made in carrying out the present invention without departing from the spirit and scope thereof and the invention is to be limited only by the appended claims.

Having now described my invention, what I claim as new and desire to secure by Letters Patent is:

1. A process for the production of a poison bait for killing rodents, wild rabbits and moles, gnawing insects and other noxious animals with similar habits; which process comprises soaking whole kernels of dry Indian corn of storable dryness having a hard, glassy, cellular tissue with a portion at the sprout end comprised of a soft, porous, cellular tissue in an aqueous solution of a poison toxic to said noxious animals for not over two hours to cause the solution to be absorbed substantially entirely in the soft, porous portion only of the kernels, and then drying the kernels to storable dryness to leave the poison substantially in said soft portion only, whereby the hard, glassy tissue remains non-toxic.

2. A poison bait prepared by the process defined in claim 1.

References Cited in the file of this patent

UNITED STATES PATENTS

| | | |
|---|---|---|
| 168,926 | Schmidt | Oct. 19, 1875 |
| 1,178,941 | Palma | Apr. 11, 1916 |
| 1,634,792 | Minaeff | July 5, 1927 |
| 1,858,177 | Aeschlimann | May 10, 1932 |
| 2,427,578 | Stahmann | Sept. 16, 1947 |

FOREIGN PATENTS

| | | |
|---|---|---|
| 402,618 | Germany | Sept. 15, 1924 |

OTHER REFERENCES

Krieger: Agricultural Chemicals, pages 46 to 48, 135, 137, 139 and 141, April 1952.

Ginsburg: Journal of Economic Entomology, pages 292 to 297, volume 28 (1935).